United States Patent [19]

Komaki et al.

[11] Patent Number: 5,568,466
[45] Date of Patent: Oct. 22, 1996

[54] MAGNETO-OPTICAL DISC

[75] Inventors: Tsuyoshi Komaki; Hiroyuki Endo; Hideki Hirata; Isamu Kuribayashi, all of Nagano, Japan

[73] Assignee: TDK Corporation, Tokyo, Japan

[21] Appl. No.: 503,084

[22] Filed: Jul. 17, 1995

[30] Foreign Application Priority Data

Aug. 10, 1994 [JP] Japan ................................ 6-209270
Nov. 21, 1994 [JP] Japan ................................ 6-311229

[51] Int. Cl.$^6$ ............................. G11B 11/00; G11B 3/70
[52] U.S. Cl. .................... 369/275.2; 369/283; 369/13; 428/64.3; 428/64.6
[58] Field of Search .................... 369/275.2, 13, 369/283, 280, 287, 288, 272; 360/59, 114; 365/122; 428/64.3, 64.6, 694 ML, 694 SC, 694 PR, 694 BP

[56] References Cited

U.S. PATENT DOCUMENTS

| | | | |
|---|---|---|---|
| 4,694,358 | 9/1987 | Muchnik et al. | 369/13 |
| 5,020,048 | 5/1991 | Arai et al. | 369/283 |
| 5,202,220 | 4/1993 | Park et al. | 369/283 |
| 5,237,548 | 8/1993 | Muchnik | 369/13 |
| 5,266,409 | 11/1993 | Schmidt et al. | 428/694 TC |
| 5,342,669 | 8/1994 | Yoshikawa et al. | 428/64.6 |
| 5,353,278 | 10/1994 | Murakami | 369/290 |
| 5,416,754 | 5/1995 | Washo | 369/13 |
| 5,492,773 | 2/1996 | Sekiya et al. | 428/694 ML |

FOREIGN PATENT DOCUMENTS

| | | | |
|---|---|---|---|
| 210540 | 1/1990 | Japan | 369/13 |
| 4-195943 | 7/1992 | Japan . | |
| 4-195944 | 7/1992 | Japan . | |
| 4-195746 | 7/1992 | Japan . | |
| 4-195747 | 7/1992 | Japan . | |
| 4-195748 | 7/1992 | Japan . | |
| 4-195749 | 7/1992 | Japan . | |
| 5-28559 | 2/1993 | Japan . | |
| 5-36131 | 2/1993 | Japan . | |
| 5-210877 | 8/1993 | Japan . | |
| 5-210883 | 8/1993 | Japan . | |
| 5-242542 | 9/1993 | Japan . | |
| 5-303784 | 11/1993 | Japan . | |

*Primary Examiner*—Tan Dinh
*Attorney, Agent, or Firm*—Watson Cole Stevens Davis, PLLC

[57] ABSTRACT

A magneto-optical disc includes a recording layer (4) and a protective film (7) of radiation-cured resin on a substrate (2). Information is written in the recording layer with the aid of a magnetic head in sliding contact with the disc. In a first form, when the protective film is subject to a micro-vibration scratch test by setting the disc in a thin film scratch tester equipped with a diamond indentor having a radius of curvature R of up to 50 μm, the relationship: $0.8 \leq L/R^2 \leq 2.7$ is met wherein L is the critical load (N.m) under which the thin film is scratched. In a second form, the protective film has a dynamic modulus of $5.0 \times 10^9$ to $4.0 \times 10^{10}$ dyn/cm$^2$ at 100° C. The disc is highly durable.

11 Claims, 2 Drawing Sheets

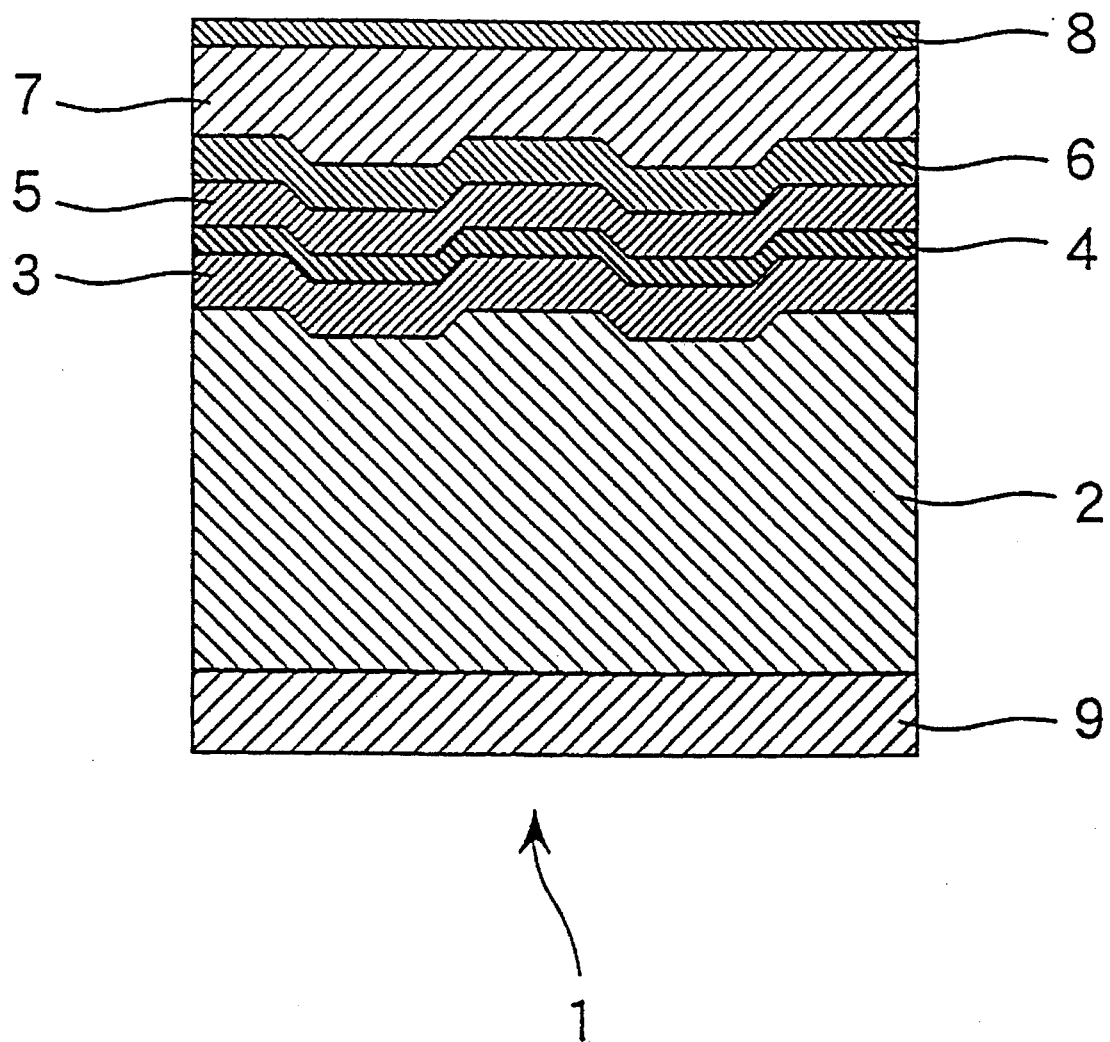

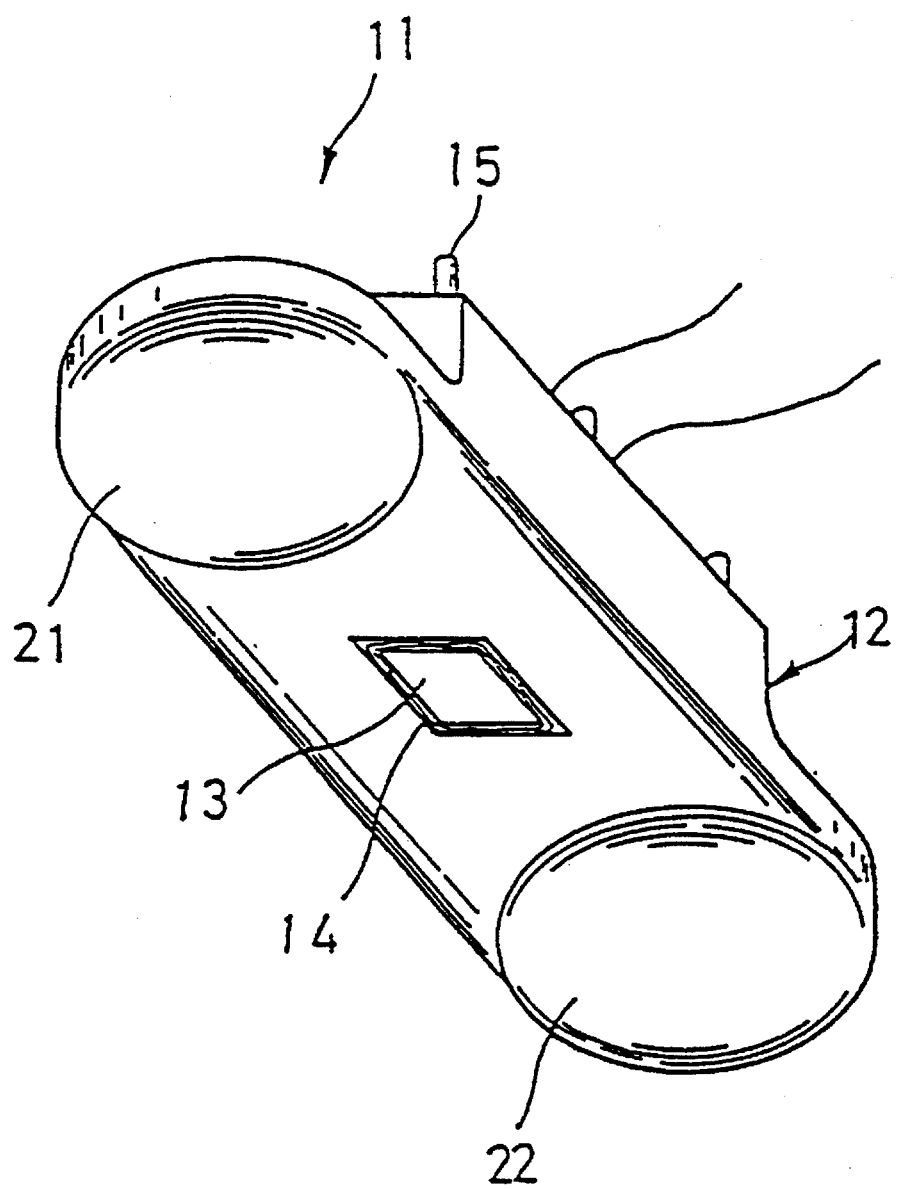

MAGNETO-OPTICAL DISC

FIELD OF THE INVENTION

This invention relates to a magneto-optical disc of the magnetic field modulation system.

BACKGROUND ART

Optical discs are of great interest as high capacity information carrying media. Among the optical discs, magneto-optical discs of the magnetic field modulation system are expected to find use in data files or the like. A magneto-optical disc is recorded in a magnetic field modulation mode by continuously irradiating a laser beam from an optical head to the recording layer of the disc for raising the temperature thereof and simultaneously applying a modulated magnetic field across the recording layer from a magnetic head opposed to the optical head. Therefore, the magnetic field modulation mode allows for overwrite recording.

Most prior art magneto-optical disc drives rely on the contact-start-and-stop (CSS) system using a flying magnetic head. The magnetic head is in contact with the disc surface at the start and end of disc rotation. Then the disc on the surface facing the magnetic head is provided with a protective coat for prohibiting adsorption of the magnetic head and crashing.

Recently a magneto-optical disc which allows for writing and reading at the same linear velocity as the compact disc (CD) was developed and put into commercial practice as a mini-disc (MD). The CSS system cannot be applied to the MD because the MD is operated at a low linear velocity of 1.2 to 1.4 m/s so that the magnetic head cannot be kept afloat. Also since the magnetic head can produce only a very weak magnetic field for various limiting factors, the magnetic head must be placed as close to the recording magnetic layer as possible. For these reasons, the magnetic head used with the MD is of the type which is kept in contact with the magneto-optical disc during writing, that is, the sliding contact type.

Writing by a sliding contact type magnetic head suffers from problems of scratching and wear of the recording magnetic layer by sliding contact because the magneto-optical disc are in continuous contact with the magnetic head. It is then necessary to provide a protective film on the magnetic head facing surface of the magneto-optical disc for protecting the recording magnetic layer. Such protective films are conventionally formed of radiation-cured resins, especially UV-cured resins. The radiation-curable resin composition and cured film thereof have many advantages including ease of application to polycarbonate substrates, firm adhesion, low moisture permeability, and higher hardness than polycarbonate.

There still remains the risk that the protective film can be scratched during sliding contact with the magnetic head, eventually leading to failure of the recording magnetic layer.

It was then proposed to provide a magneto-optical disc on its magnetic head facing surface with a wear resistant protective film having a roughened surface or a wear resistant protective film of UV-cured filler-loaded resin. Known wear resistant protective films include a sheet-like sliding protective film having a pencil hardness of at least 2H and a surface roughness Ra of 2,000 to 4,000 Å (Japanese Patent Application Kokai (JP-A) No. 28559/1993), a protective layer loaded with particles having a Vickers hardness of 1,300 to 3,000 kg/mm$^2$ (JP-A 36131/1993), a protective layer whose surface is roughened to a surface roughness Ra of 0.01 to 0.04 μm by burnishing (JP-A 303784/1994), and a protective film including a protective layer of a UV-cured resin and a wear resistant protective layer of a UV-cured resin loaded with silicon dioxide particles (JP-A 210877/1993). It was also proposed to roughen a surface of a wear resistant protective film by blasting abrasives (JP-A 195943/1992) or by burnishing (JP-A 195749/1992), to control the surface roughness Rmax within a specific range (JP-A 195748/1992), and to form a laminate including an undercoat layer with a predetermined Rmax and wear resistant protective layer (JP-A 195746/1992). These wear resistant protective films are still unsatisfactory in resistance to abrasion and scratch and thus less durable.

It was also proposed to form a wear resistant protective film by adding lubricant to a UV-curable resin, followed by coating and UV curing. Alternatively, a protective film of a UV-cured resin is coated on the surface with a lubricant. For example, in JP-A 303784/1994, a protective layer is roughened to a surface roughness Ra of 0.003 to 0.05 μm by burnishing and then top coated with a lubricant. JP-A 242542/1993 discloses an overcoat layer comprising a UV-cured resin, diglycerin tetralaurate and optionally, isodecyl adipate. JP-A 210883/1993 discloses a protective film formed from a composition comprising a photo-curable resin based on urethane acrylate and a suitable amount of a PO/EO modified silicone of a specific structure. However, these protective films can be scratched by sliding contact with a magnetic head, particularly in a dusty environment, unless the UV-cured resin has satisfactory properties.

Other means for enhancing the durability of magneto-optical discs include cleaning of a wear resistant protective film on its surface as disclosed in JP-A 195944/1992. It is also known from JP-A 195747/1992 to treat an underlying surface with an electric discharge before forming a wear resistant protective film thereon for the purpose of enhancing the adhesion of the protective film.

However, all these protective films are not satisfactorily durable against sliding contact with the magnetic head. There still remains the problem that the protective film can be damaged.

For a recently developed MD data system utilizing MID as an external memory of a computer, there is a need for a more durable protective film.

SUMMARY OF THE INVENTION

Therefore, an object of the present invention is to provide a magneto-optical disc having a wear resistant protective film which is free of scratches or flaws during repetitive sliding contact with a magnetic head so that the disc as a whole is fully durable.

The present invention is directed to a magneto-optical disc comprising on a substrate a recording layer and a protective film of radiation-cured resin. Information is written in the recording layer with the aid of a magnetic head in sliding contact with the protective film.

According to a first aspect of the present invention, when the protective film is subject to a micro-vibration scratch test by setting the disc in a thin film scratch tester equipped with a diamond indentor having a radius of curvature R of up to 50 μm, the relationship: $0.8 \leq L/R^2 \leq 2.7$ is satisfied. L is the critical load (N.m) under which the thin film is scratched.

According to a second aspect of the present invention, the protective film of radiation-cured resin has a dynamic modulus of $5.0\times10^9$ to $4.0\times10^{10}$ dyn/cm$^2$ at 100° C. In one preferred embodiment, the protective film has a dynamic modulus of $2.5\times10^9$ to $3.0\times10^{10}$ dyn/cm$^2$ at 150° C. More preferably, the protective film has a dynamic modulus of $1.0\times10^{10}$ to $4.0\times10^{10}$ dyn/cm$^2$ at 100° C. and a dynamic modulus of $5.0\times10^9$ to $3.0\times10^{10}$ dyn/cm$^2$ at 150° C. Often the protective film has a maximum tan$\delta$ of up to 0.2.

In both the first and second aspects, the protective film of radiation-cured resin is preferably obtained by curing with radiation a polymerizable composition comprising 40 to 90% by weight of a trifunctional or polyfunctional monomer.

The magneto-optical disc may further include a lubricating layer on the protective film.

Typically the magnetic head includes a slider having a dynamic hardness of 5 to 40.

BENEFITS OF THE INVENTION

The system of recording information in a magneto-optical disc with the aid of a magnetic head in sliding contact therewith suffers from the problem of increased error rates resulting from potential abrasion and damage of the disc. The present invention improves the dynamic durability of the magneto-optical disc by providing a protective film and optionally a lubricating layer on the surface of the disc to come in contact with the magnetic head. The protective film should satisfy the relationship: $0.8 \leq L/R^2 \leq 2.7$ when the disc is set in a thin film scratch tester equipped with a diamond indentor having a radius of curvature R (μm) of up to 50 μm and a micro-vibration scratch test is carried out by scratching the protective film with the indentor to determine the critical load L (N.m) under which the thin film is scratched. The dynamic durability of the magneto-optical disc is also improved when the protective film has a dynamic modulus of $5.0\times10^9$ to $4.0\times10^{10}$ dyn/cm$^2$ at 100° C.

BRIEF DESCRIPTION OF THE DRAWINGS

FIG. 1 is a fragmentary schematic cross-sectional view of one exemplary magneto-optical disc according to the invention.

FIG. 2 is a perspective view of a magnetic head.

BEST MODE FOR CARRYING OUT THE INVENTION

Briefly stated, the magneto-optical disc of the invention includes a recording layer on a substrate and a protective film of radiation-cured resin on the recording layer. Referring to FIG. 1, there is schematically illustrated in cross section one preferred layer construction of the magneto-optical disc. The disc generally designated at 1 is shown in FIG. 1 as including on one surface of a substrate 2, a first dielectric layer 3, a magneto-optical recording layer 4, a second dielectric layer 5, a reflective layer 6, and a protective layer 7 in the described order. Further preferably, a lubricating layer 8 is disposed on the protective layer 7. The disc further includes a hard coat 9 which is disposed on the surface of the substrate 2 remote from the recording layer 4.

During disc operation, a magnetic head (not shown) comes in sliding contact with the surface of the protective film 7 or lubricating layer 8. The head is generally supported by a suspension mechanism so that it can closely follow the rotating disc despite axial runouts.

The protective film 7 is composed of a radiation-cured resin composition and has a dual function of presenting a sliding surface and protecting the disc from physical and chemical attacks including corrosion.

The protective film should satisfy the relationship: $0.8 \leq L/R^2 \leq 2.7$, especially $0.8 \leq L/R^2 \leq 2.0$ when the disc is set in a thin film scratch tester equipped with a diamond indentor having a radius of curvature R (μm) and a micro-vibration scratch test is carried out by forcing the indentor against the protective film under pressure to determine the critical load L (N.m) under which the thin film is indented. The diamond indentor has a radius of curvature R of up to 50 μm.

With the above-defined relationship met, the protective film receives no or little damage or scratches after repeated sliding contact with the magnetic head and is thus fully durable. That is, the magneto-optical disc is fully durable. With $L/R^2<0.8$, many scratches will occur and the disc is less durable. With $L/R^2>2.7$, the protective film is less firmly adhered to the underlying layer.

The diamond indentor used in the scratch test has a radius of curvature $R \leq 50$ μm because such indentor ensures reproducible measurement. The diamond indentor typically has a radius of curvature R of 5 to 50 μm, preferably 5 to 25 μm, more preferably 5 to 20 μm because more precise measurement is insured. Other measurement conditions are not critical although typical conditions include an indentor oscillation amplitude of about 100 μm, a stage inclination angle of about 4 degrees, and a stage feed speed of about 5 μm/sec.

Instead of or in addition to the above-defined relationship, the protective film should have a dynamic modulus of $5.0\times10^9$ to $4.0\times10^{10}$ dyn/cm$^2$ at 100° C., preferably $1.0\times10^{10}$ to $4.0\times10^{10}$ dyn/cm$^2$ at 100° C. Within this range of dynamic modulus, the protective film receives no or little damage or scratches after repeated sliding contact with the magnetic head and is thus fully durable. That is, the magneto-optical disc is fully durable. A dynamic modulus of less than $5.0\times10^9$ dyn/cm$^2$ leads to a loss of durability whereas a protective film with a dynamic modulus of more than $4.0\times10^{10}$ dyn/cm$^2$ is difficult to form and less firmly adhered to the underlying layer.

In one preferred embodiment, the protective film has a dynamic modulus of $2.5\times10^9$ to $3.0\times10^{10}$ dyn/cm$^2$ at 150° C., more preferably $5.0\times10^9$ to $3.0\times10^{10}$ dyn/cm$^2$ at 150° C. Further preferably, the protective film has a dynamic modulus of $2.0\times10^{10}$ to $5.0\times10^{10}$ dyn/cm$^2$ at 30° C. By limiting the dynamic modulus to fall in these ranges, more benefits of the invention are obtained. Outside these ranges, there would occur similar problems as discussed for the dynamic modulus at 100° C.

Preferably the protective film has a maximum dissipation factor (tan$\delta$) of up to 0.2, especially up to 0.18 at a temperature of 30° to 200° C. No lower limit need be imposed on this maximum of tan$\delta$ of the protective film although it is generally about 0.0001. With a maximum of tan$\delta$ of up to 0.2, more benefits of the invention are obtained. If the maximum of tan$\delta$ exceeds this limit, the protective film would be less desirably durable.

It is to be noted that the dynamic modulus and tan$\delta$ are measured by forming a test film of about 100 μm thick on a transparent substrate, typically glass substrate, cutting the film into sections of appropriate size, and peeling a test film section. Measurement is done by a viscoelastic spectrometer, typically at a frequency of about 3.5 kHz.

The protective film 7 of radiation-cured resin having a $L/R^2$ value and/or dynamic modulus within the above-defined range is preferably formed by coating a radiation-curable compound or a polymerizable composition containing the same and curing the coating with radiation.

The radiation-curable compounds used herein include monomers, oligomers and polymers having contained or introduced in their molecule a group capable of crosslinking or polymerization upon exposure to radiation, for example, such as an acrylic double bond as in acrylic acid, methacrylic acid or esters thereof having an unsaturated double bond which is sensitive to ionization energy and radical polymerizable, an allyl double bond as in diallyl phthalate, and an unsaturated double bond as in maleic acid and maleic acid derivatives. They may be used alone or in admixture.

The preferred radiation-curable monomers are compounds having a molecular weight of less than 2,000 and preferred oligomers are those having a molecular weight of 2,000 to 10,000. Exemplary monofunctional monomers include styrene, N-vinylpyrrolidone, ethyl (meth)acrylate, (meth)acryl isocyanurate, tetrahydrofurfuryl (meth)acrylate, dicyclopentanyl (meth)acrylate, cyclohexyl (meth)acrylate, and isobornyl (meth)acrylate. Exemplary difunctional monomers include ethylene glycol di(meth)acrylate, diethylene glycol di(meth)acrylate, triethylene glycol di(meth)acrylate, trimethylol propane di(meth)acrylate, neopentyl glycol di(meth) acrylate, 1,6-hexane glycol di(meth)acrylate, polyethylene glycol di(meth)acrylate, and hydroxypivalic acid neopentyl glycol di(meth)acrylate. Exemplary tri- or polyfunctional monomers include pentaerythritol tetra(meth)-acrylate, pentaerythritol tri-(meth)acrylate, trimethylolpropane tri(meth)acrylate, tris [(meth)acryloxyethyl]-isocyanurate, ditrimethylolpropane tetra(meth)acrylate, and dipentaerythritol hexa(meth)acrylate. Also included are acryl-modified products of urethane elastomers, those compounds having a functional group such as COOH introduced therein, (meth)acrylates of phenol ethylene oxide adducts, compounds wherein a (meth)acryl group or ε-caprolactoneacryl group is attached to a pentaerythritol condensed ring as disclosed in Japanese Patent Application No. 072888/1987, and acryl group-bearing monomers and/or oligomers such as special acrylates as disclosed in Japanese Patent Application No. 072888/1987. Other useful radiation-curable oligomers include oligo-ester acrylates, acryl modified products of urethane elastomers, and those products having a functional group such as COOH introduced therein.

A polymerizable composition which is subject to radiation curing in the practice of the invention should preferably contain 40 to 90% by weight, especially 45 to 85% by weight of a polyfunctional monomer, that is, at least trifunctional monomer, preferably tri- to penta-functional monomer, especially tri- and/or tetra-functional monomer. The tri- or polyfunctional monomer used herein may be selected from the radiation-curable monomers mentioned above, with the (meth)acrylic monomers being preferred. The tri- or polyfunctional monomers are those monomers having at least three unsaturated double bonds capable of crosslinking or polymerizing upon exposure to radiation, especially those monomers having at least three acrylic double bonds since (meth)acrylic monomers are preferred.

In addition to or instead of the above-mentioned compounds, radiation-curable compounds obtained by modifying thermoplastic resins to be sensitive to radiation may also be used. Examples of such radiation-curable resins include thermoplastic resins having contained or introduced in their molecule a group capable of crosslinking or polymerization upon exposure to radiation, for example, such as an acrylic double bond as in acrylic acid, methacrylic acid or esters thereof having an unsaturated double bond which is radical polymerizable, an allyl double bond as in diallyl phthalate, and an unsaturated bond as in maleic acid and maleic acid derivatives. Examples of the thermoplastic resin which can be modified into a radiation-curable resin include vinyl chloride copolymers, saturated polyester resins, polyvinyl alcohol resins, epoxy resins, phenoxy resins, and cellulose derivatives. Other resins which can be modified to be radiation-sensitive include polyfunctional polyester resins, polyether ester resins, polyvinyl pyrrolidone resins and derivatives (e.g., PVP olefin copolymers), polyamide resins, polyimide resins, phenol resins, spiro-acetal resins, and acrylic resins containing at least one acrylate or methacrylate having a hydroxyl group as a polymerizable component.

Since the polymerizable composition is cured by exposure to radiation, especially ultraviolet (UV) radiation, photopolymerization initiators or sensitizers are preferably contained in the composition. The photo-polymerization initiator used herein is not critical and may be selected from conventional initiators, for example, acetophenone derivatives, benzoin derivatives, benzophenone derivatives, and thioxanthane derivatives, alone or in admixture. The content of photo-polymerization initiator in the composition is preferably about 0.5 to 10% by weight. The polymerizable composition may be prepared by synthesizing a radiation-curable compound by a conventional method or by using such commercially available compound.

The protective film is preferably about 1 to about 30 μm thick, more preferably about 2 to about 20 μm thick. With a thickness below this range, it would be difficult to form a film of uniform thickness, resulting in a loss of durability. A too thick film would crack due to shrinkage during curing so that the disc tends to warp. It is to be noted that the protective film 7 shown in FIG. 1 has a single layer structure although a two or multi-layer structure is also acceptable. The protective film of multi-layer structure has a total thickness in the above-defined range.

The technique of forming the protective film 7 is not critical although coating techniques are convenient. A choice is generally made of spin coating, screen printing, gravure coating, spray coating, dipping, and other well-known coating techniques. Appropriate coating conditions may be determined in accordance with the viscosity of the polymerizable composition, the thickness of an intended coating, and other factors. For a protective film of a single layer structure or the lowermost layer of a multi-layer structure protective film, spin coating is preferred because the influence of dust and debris is minimized and the spin coating technique lends itself to mass production.

The coating is then cured by irradiating UV radiation. If desired, the coating may be heated before exposure to radiation and electron radiation may be used instead of UV radiation. Typically, UV radiation having an intensity of more than about 50 mW/cm$^2$ is irradiated to the coating in a dose of about 200 to about 2,000 mJ/cm$^2$. The UV source may be conventional one such as a mercury lamp. Upon exposure to I/V radiation, the compound undergoes radical polymerization. The thus cured protective coating preferably has a hardness of less than 2H as expressed in pencil hardness according to JIS K-5400 though the hardness is not critical.

Now the remaining components of the disc are described.

The substrate 2 is a generally annular transparent substrate having a thickness of a few millimeters. This is because information is written in and read out of the magneto-optical disc of the present invention by positioning an optical head on the rear side of the substrate 2 (the lower side as viewed in FIG. 1) so that laser light is directed to the recording layer 4 through the substrate 2. The substrate is generally formed of resins such as polycarbonate resins, acrylic resins, polyolefin resins, and styrene resins as well as glass. The surface of the substrate 2 on which the recording layer 4 is to be formed is generally provided with grooves and pits for tracking and addressing purposes.

The dielectric layers 3 and 5 are provided for improving C/N and preventing corrosion of the recording layer. Although dielectric layers are optional, it is desirable to provide at least one, especially both of the first and second dielectric layers 3 and 5. Preferably each dielectric layer has a thickness of about 30 to 300 nm. It is typically formed from an oxide, carbide, nitride, sulfide or a mixture thereof by conventional gas phase deposition techniques such as sputtering, evaporation and ion plating.

The recording layer 4 disposed between the substrate 2 and the protective film 7, more specifically between the first and second dielectric layers 3 and 5 is one in which information can be magnetically recorded using a modulated magnetic field and the recorded information be read through magneto-optical conversion. The recording layer 4 may be formed of any desired material which is capable of such magneto-optical recording. Preferably, it is prepared by depositing an alloy containing a rare earth metal element, especially a rare earth metal-transition metal alloy by sputtering, evaporation or ion plating, preferably by sputtering, to form an amorphous film. Some preferred examples of the recording layer composition are TbFeCo, DyTbFeCo, NdDyFeCo, and NdGdFeCo. The recording layer is generally about 10 to 1,000 nm thick.

The reflective layer 6 is optionally disposed on the second dielectric layer 5 and formed of any of relatively high reflectivity metal materials which include Au, Ag, Pt, Al, Ti, Cr, Ni and Co and alloys or compounds thereof. The reflective layer may be formed in a similar manner to the recording layer 4. The reflective layer is generally about 30 to 200 nm thick.

Also preferably, the lubricating layer 8 is disposed on the protective film 7 as shown in FIG. 1. The lubricating layer 8 combined With the protective layer 7 affords the advantages of smoother travel of the head thereon as well as further enhanced durability. The lubricating layer 8 may be formed of any of conventional lubricants, for example, silicone lubricants, fluoride lubricants, and liquid lubricants such as fatty acid lubricants and modified or esterified products thereof. It may be formed by conventional coating techniques including spin coating, spray coating, and dipping. Appropriate coating conditions may be determined by taking into account the viscosity of lubricant, the thickness of lubricant coating or the like. Typically the lubricant is coated in a coverage of about 4 to 100 mg per square meter of the disc.

On the rear surface of the substrate 2 is formed a transparent hard coating 9 as shown in FIG. 1, if desired. The composition and thickness of the hard coating may be the same as the protective film 7. Preferably the hard coating 9 is rendered antistatic by adding a surfactant or the like. The hard coating may be disposed not only on the rear surface of the substrate, but also on the inner and outer peripheral edges of the disc.

The magneto-optical disc of the invention thus far described should preferably have a coefficient of friction of 0.1 to 0.3 and a dynamic endurance of at least 2,000,000 passes as measured by rotating the disc in sliding contact with a magnetic head until defects occur in the disc.

Next, the magnetic head which is used in conjunction with the magneto-optical disc of the present invention is described.

Referring to FIG. 2, there is illustrated one preferred example of the magnetic head. The magnetic head generally designated at 11 includes a slider housing 12 having a head core and a winding 14 accommodated therein. The slider housing 12 is coupled to a magnetic head drive (not shown) by a resilient member such as flexure or gimbal. It is to be noted that the slider housing 12 is provided at the top with studs 15 which are used for coupling to the magnetic head drive.

The surface of the slider housing 12 which faces the recording medium or magneto-optical disc includes sliding areas 21 and 22 between which is disposed a magnetic field generating portion 13 of the head core. Each of the sliding areas is a fraction of a spherical surface which comes in point contact with the recording medium surface. Since the point contact is maintained even when the slider housing 12 is inclined by debris on the recording medium surface, there occurs little change of sliding resistance. When seeking is carried out in the disc-shaped recording medium, there occurs only a little change of sliding resistance in the seek direction. When one of the sliding areas 21 and 22 is lifted apart from the recording medium surface by interposing debris, the spacing of the magnetic field producing area 13 from the recording medium surface is approximately one, half of the spacing of that sliding area from the recording medium surface. This is because the magnetic field generating portion 13 of the head core is located substantially at the center intermediate the sliding areas 21 and 22.

The motion direction of the slider relative to the recording medium is not critical although it is generally coincident with a longitudinal direction of the slider housing 12, that is, a direction connecting the sliding areas 21 and 22 or a direction perpendicular thereto. Preferably the motion direction of the slider relative to the recording medium is coincident with a direction connecting the sliding areas 21 and 22 because a wider recording region is available in the disc-shaped recording medium.

The magnetic field generating portion 13 of the head core is located intermediate the sliding areas 21 and 22 in the illustrated example. Preferably the magnetic field generating portion 13 is located near the center of gravity of a straight line connecting the centers of the sliding areas or a polygon delimited by connecting the centers of the sliding areas where more than two sliding areas are provided. The magnetic head is forced under a predetermined load while it slides on the surface of the recording medium. Preferably the load is applied to the head near the center of gravity.

In the illustrated structure, the lower edge of the slider housing 12, that is, the edge along the interface between the lateral surface and the recording medium facing surface of the slider housing 12 and the interface between the lateral surface and the sliding areas of the slider housing 12 is preferably curvilinear. Where the sliding areas 21 and 22 are continuous to the lateral surface of the slider housing 12 as in the illustrated embodiment, the interfacial curved surface should preferably smoothly continue to the curved surface of the sliding areas. Upon loading and unloading of the recording medium to and from the drive, the magnetic head must be moved to a retracted position. Such retraction is generally accompanied by a great change in attitude of the slider so that the lower edge of the slider can contact the medium surface. The rounded lower edge of the slider housing prevents any damage to the medium surface.

The curved surface presented by the sliding areas may have any desired radius of curvature. The radius of curvature may be properly selected in the range of about 0.5 to 20 mm, for example, while taking into account the projection distance of the sliding area from the medium facing surface of the slider housing and the dimensions of the slider housing. The sliding areas should preferably have a relatively large radius of curvature in order to minimize the impact upon collision of the slider with debris and projections on the recording medium surface.

The projection distance of the sliding areas from the magnetic field producing portion 13 of the head core may be properly determined in accordance with various other requirements. For example, the spacing between the magnetic field producing portion 13 and the recording medium is dictated by the strength of the applied magnetic field and the capability of the head. Then the projection distance of the sliding areas from the magnetic field producing portion 13 is properly determined in accordance with the specifications of the magneto-optical recording medium and the capability of the head core, often falling in the range of about 50 to 200 μm.

Alternatively, the magnetic field producing portion 13 may project beyond the medium facing surface of the slider housing or conversely be contained within the slider housing. Where the magnetic field producing portion 13 is contained within the slider housing, it may be covered with the sliding housing material such as resin. In this case, the projection distance of the sliding area from the medium facing surface of the slider housing should preferably be 50 μm or more.

The load applied to the magnetic head is not critical although it should preferably be low, typically about 1 gf or less, in order for the recording medium to last longer.

The dimensions of the slider housing may be properly determined in accordance with the specifications of the recording medium to be combined therewith, for example, the window size in a disc cartridge. The slider housing contoured as shown in FIG. 2 generally has a length of about. 5 to 10 mm, a width of about 2 to 5 mm, and a height of about 1 to 3 mm.

The sliding,areas should preferably be smooth and typically have a surface roughness Rmax of up to 2 μm.

The slider housing is formed of a non-magnetic material. No particular limits are imposed on the material and preparation method of the slider housing. Use of a resin is advantageous because it can be molded to any desired shape. Then the slider housing and sliding areas are integrally formed by injection molding of a resin. Any desired resin may be used although polyallylate, polyacetal, Teflon, PEEK and nylon resins are preferred for lower sliding friction. The resin may be loaded with less than 50% by weight of a filler such as alumina and potassium titanate. The slider should preferably have a dynamic hardness DH of 5 to 40, more preferably 10 to 30, especially 10 to 25 as measured by a dynamic micro-hardness gage Model DUH-200 manufactured by Shimazu Mfg. K.K.

The dynamic hardness DH is defined by the following expression:

$$DH = \alpha \cdot P/D^2$$

wherein

P is a test load (gf),

D is a penetration or indenting depth (μm) of an indentor into a sample, and

α is a constant inherent to the shape of the indentor, for example, α=37.838 for a 115° triangular pyramid indentor (Vickers indentor) and α=147.28 for a 100° triangular pyramid indentor. In the measurement reported herein, a 115° triangular pyramid indentor was used and hence, α=37.838 and the test load P was equal to 1 gf.

The magneto-optical disc of the present invention is most advantageous in wear resistance when it is operated in combination with the slider having a hardness in the above-mentioned range. The magneto-optical disc of the invention can be operated at a linear velocity in the range of 1.2 to 5.6 m/sec. Information is recorded in the magneto-optical disc of the invention in the well-known magnetic field modulation mode Using a magnetic head as mentioned above to apply a magnetic field of about 50 to 300 Oe.

EXAMPLE

Examples of the present invention are given below by way of illustration and not by way of limitation.

Example 1

First prepared were samples for dynamic modulus measurement. The samples were prepared by coating a polymerizable composition of the following formulation to a glass substrate of 1.2 mm thick, curing the coating to a thickness of 100 μm, cutting the coating into strips of 40 mm×4 mm, and peeling the strips from the glass substrate. Note that curing was done by irradiating I/V radiation in a dose of 500 mJ/cm² while maintaining the coating at a surface temperature of 55° C.

| Polymerizable composition | Parts by weight |
|---|---|
| Sample No. 1 | |
| Pentaerythritol triacrylate | 80 |
| Hydroxypivalic acid neopentyl glycol diacrylate | 5 |
| N-vinylpyrrolidone | 10 |
| Acetophenone photo-polymerization initiator | 5 |
| Sample No. 2 | |
| Pentaerythritol triacrylate | 60 |
| 1,6-hexanediol diacrylate | 15 |
| Isobornyl acrylate | 20 |
| Acetophenone photo-polymerization initiator | 5 |
| Sample No. 3 | |
| Trimethylolpropane triacrylate | 60 |
| Diethylene glycol diacrylate | 15 |
| Dicyclopentanyl acrylate | 20 |
| Acetophenone photo-polymerization initiator | 5 |
| Sample No. 4 | |
| Trimethylolpropane triacrylate | 50 |
| Acrylated isocyanurate | 20 |
| Tetrahydrofurfuryl acrylate | 25 |
| Acetophenone photo-polymerization initiator | 5 |
| Sample No. 5 | |
| Pentaerythritol triacrylate | 20 |
| Hydroxypivalic acid neopentyl glycol diacrylate | 50 |
| Dicyclopentanyl acrylate | 25 |
| Acetophenone photo-polymerization initiator | 5 |
| Sample No. 6 | |
| Trimethylolpropane triacrylate | 15 |
| 1,6-hexanediol diacrylate | 15 |
| Dicyclopentanyl acrylate | 65 |
| Acetophenone photo-polymerization initiator | 5 |

These samples were measured for dynamic modulus by means of a viscoelasticity spectrometer Type VES-F-111 manufactured by Iwamoto Mfg. K.K. at a wavelength of 3.5 kHz and at intervals of 2° C. while heating the samples from 30° C. to 200° C. A maximum of dissipation factor (tanδ) was similarly measured and the temperature at which the maximum loss was measured was recorded. The results are shown in Table 1.

Next, magneto-optical disc samples having a protective film of the same composition as the dynamic modulus measuring samples were prepared. The disc samples had a layer structure as shown in FIG. 1.

A disc-shaped substrate of polycarbonate (PC) resin had an outer diameter of 64 mm, an inner diameter of 11 mm and a recording region thickness of 1.2 mm. The substrate on one major surface and the peripheral side surfaces was coated with a hard coat composition which was UV cured into a hard coat of about 5 μm thick.

On the other major surface of the substrate opposite to the hard coat bearing surface, a first dielectric layer of SiNx was deposited to a thickness of 80 nm by RF magnetron sputtering. On the dielectric layer, a magneto-optical recording layer having a composition $Tb_{23}Fe_{72}Co_5$ was deposited to a thickness of 20 nm by sputtering. On the recording layer, a second dielectric layer of the same composition as the first dielectric layer was deposited to a thickness of 20 nm by RF magnetron sputtering. On the second dielectric layer, a reflective layer of aluminum alloy was deposited to a thickness of 80 nm by sputtering. On the reflective layer, a protective film and a lubricant layer were sequentially formed.

The protective film was formed by spin coating the polymerizable composition mentioned above and curing the coating upon exposure to UV radiation. The cured coating had an average thickness of about 8 μm. The UV dose was 500 mJ/cm² and the surface temperature was 55° C.

On the protective film, a silicone lubricant was spin coated. The lubricating layer had a coverage of about 25 mg of the lubricant per square meter of the disc surface.

The thus fabricated disc samples were designated Disc Sample Nos. 1 to 6 in accordance with the polymerizable compositions of their protective films.

The disc samples were operated in combination with a magnetic head of the structure shown in FIG. 2. While rotating the disc at a linear velocity of 2.8 m/s, the stress applied to the head was measured by means of a friction tester manufactured by Matsuzaka Trading K.K., from which a coefficient of dynamic friction μ was calculated. The operation was continued under the same conditions to determine the number of passes repeated until the protective film of the disc sample failed. The number of passes represents dynamic durability.

The slider of the magnetic head in contact with the disc was formed of a polyacetal resin compound loaded with 30% by weight of potassium titanate filler. The slider had a dynamic hardness DH of 23.7 as measured by a dynamic micro-hardness gage Model DUH-200 manufactured by Shimazu Mfg. K.K. A load of 1 g was applied to the head.

The protective films of the magneto-optical disc samples were measured for pencil hardness according to JIS K-5400.

The results are shown in Table 1. Note that a dynamic modulus measuring sample and a corresponding magneto-optical disc sample are commonly designated by the same sample numbering.

TABLE 1

| Sample No. | Tri-and polyfunctional monomer content of polymerizable composition (wt %) | Dynamic modulus (dyn/cm²) | | | tan δ Maximum | °C. | Pencil hardness (on PC) | Coefficient of dynamic friction | Dynamic durability (passed) |
|---|---|---|---|---|---|---|---|---|---|
| | | 30° C. | 100° C. | 150° C. | | | | | |
| 1 (invention) | 80 | $3.01 \times 10^{10}$ | $1.98 \times 10^{10}$ | $1.56 \times 10^{10}$ | 0.048 | 66 | 2H> | 0.26 | >20,000,000 |
| 2 (invention) | 60 | $3.11 \times 10^{10}$ | $1.35 \times 10^{10}$ | $6.06 \times 10^9$ | 0.090 | 120 | 2H> | 0.20 | 6,000,000 |
| 3 (invention) | 60 | $2.75 \times 10^{10}$ | $9.05 \times 10^9$ | $2.95 \times 10^9$ | 0.110 | 94 | 2H> | 0.30 | 2,000,000 |
| 4 (invention) | 50 | $2.08 \times 10^{10}$ | $6.56 \times 10^9$ | $3.72 \times 10^9$ | 0.174 | 144 | 2H> | 0.30 | 2,000,000 |
| 5 (comparison) | 20 | $1.74 \times 10^{10}$ | $1.76 \times 10^9$ | $6.19 \times 10^8$ | 0.258 | 100 | 2H> | 0.30 | 100,000 |
| 6 (comparison) | 15 | $2.51 \times 10^{10}$ | $3.13 \times 10^8$ | $2.82 \times 10^8$ | 0.549 | 66 | 2H> | 0.30 | 40,000 |

It is seen from Table 1 that although the protective films of the inventive and comparative samples had a pencil hardness of less than 2H, the inventive samples, Nos. 1 to 4, satisfying the requirement of dynamic modulus according to the invention showed a dynamic durability of more than 2,000,000 passes, especially sample No. 1 was free of sliding flaw over 20,000,000 passes. In the comparative sample No. 5 whose protective film had a dynamic modulus of 1.76×10⁹ dyn/cm² at 100° C. and 6.19×10⁸ dyn/cm² at 150° C., both outside the scope of the invention, sliding flaws occurred at a durability test cycle of 100,000 passes. In the comparative sample No. 6 whose protective film had a lower dynamic modulus than No. 5, sliding flaws occurred at a durability test cycle of 40,000 passes. The inventive samples had a dissipation factor (tanδ) of 0.174 at maximum whereas the comparative samples had a dissipation factor (tanδ) in excess of 0.200.

Note that when a magnetic head with a slider having a dynamic hardness outside the range of 5 to 40 was used, the magneto-optical disc and the head gave rise to no practical problem of durability. However, substantial improvements in durability were observed when a magnetic head with a slider having a dynamic hardness in the range of 5 to 40 was used.

Another comparative run was performed by modifying the polymerizable composition of sample No. 1. A polymerizable composition was prepared by using only pentaerythritol triacrylate as the radiation-curable compound and mixing 95 parts by weight of the compound with 5 parts by weight of the photo-polymerization initiator. The composition was coated and cured by the same procedure as sample No. 1, failing to provide an acceptable coating.

Example 2

Magneto-optical disc samples were fabricated by the same procedure as in Example 1 except that the polymerizable composition for forming the protective film was changed as shown below.

| Polymerizable composition | Parts by weight |
|---|---|
| Sample No. 21 | |
| Pentaerythritol triacrylate | 48 |
| Hydroxypivalic acid neopentyl glycol diacrylate | 18 |
| N-vinylpyrrolidone | 30 |
| Irgacure 651 | 4 |
| Sample No. 22 | |
| Trimethylolpropane triacrylate | 53 |
| 1,6-hexanediol diacrylate | 22 |
| Tetrahydrofurfuryl acrylate | 21 |
| Irgacure 907 | 4 |
| Sample No. 23 | |
| Pentaerythritol triacrylate | 61 |
| Triethylene glycol diacrylate | 20 |
| Dicyclopentanyl acrylate | 15 |
| Irgacure 907 | 4 |
| Sample No. 24 | |
| Dipentaerythritol hexaacrylate | 63 |
| Neopentyl glycol diacrylate | 18 |
| Dicyclopentanyl acrylate | 15 |
| Irgacure 651 | 4 |
| Sample No. 25 | |
| Pentaerythritol triacrylate | 33 |
| Polyethylene glycol diacrylate | 32 |
| Tetrahydrofurfuryl acrylate | 31 |
| Irgacure 651 | 4 |
| Sample No. 26 | |
| Dipentaerythritol hexaacrylate | 92 |
| Hydroxypivalic acid neopentyl glycol diacrylate | 2 |
| Dicyclopentanyl acrylate | 2 |
| Irgacure 907 | 4 |

\* Irgacure 651 and 907 are acetophenone photo-polymerization initiators commercially available from Ciba Geigy.

The polymerizable composition was spin coated and cured upon exposure to UV radiation, forming a protective film. The curing conditions included an input of 160 W/cm from a high pressure mercury lamp and a UV dose of 500 mJ/cm$^2$. The protective film is cured had an average thickness of about 7 μm. A dilution of 0.1% by weight silicone oil in hexane was spray coated on the protective film surface and dried to form a lubricating layer. The lubricating layer had a coverage of about 25 mg of the lubricant (silicone oil) per square meter of the disc surface. The thus fabricated magneto-optical disc samples were designated Disc Sample Nos. 21 to 26 in accordance with the polymerizable compositions of their protective films.

The disc samples were subject to a thin film scratch test. A thin film scratch tester manufactured by Reska K.K. was equipped with a diamond indentor having a radius of curvature R of 5 μm, 15 μm, and 25 μm as reported in Table 2. The tester was loaded with a disc sample. With the diamond indentor placed in pressure contact with the protective film, the test was carried out at an indentor oscillation amplitude of 100 μm, a stage inclination angle of 4°, and a stage feed speed of 5 μm. The critical load L (N.m) under which the thin film under test, that is, protective film was scratched was measured. The value of $L/R^2$ was calculated therefrom.

Using a magnetic head for mini-discs (manufactured by Sony Corporation), each disc sample was tested as in Example 1 to determine the number of passes repeated until sliding flaws occurred in the protective film of the disc sample. The number of passes represents dynamic durability. Note that the magnetic head had a dynamic hardness of 23.7 as measured by the same procedure as in Example 1, a load of 1 g was applied to the head, and the disc was rotated at 2.8 m/s.

Additionally, the disc samples were stored under hot humid conditions (80° C. and RH 80%) for one week. It was visually observed whether or not the protective film was peeled. Also, the disc samples were contained in cartridges which were subject to a vibration test by vibrating at a frequency of 13 to 14 Hz and an amplitude (p-p) of 0.7 mm in x, y and z directions each for 20 minutes, 60 minutes in total. It was visually observed whether or not the protective film was peeled.

The results are shown in Table 2.

TABLE 2

| Sample No. | Tri- and polyfunctional monomer content of polymerizable composition (wt %) | Thin film scratch test R = 5 μm L (N·m) | $L/R^2$ | R = 15 μm L (N·m) | $L/R^2$ | R = 25 μm L (N·m) | $L/R^2$ | Dynamic durability (passed) | Adhesion After storage (80° C., 80% RH, 1 week) | Vibration test |
|---|---|---|---|---|---|---|---|---|---|---|
| 21 (invention) | 48 | 25.2 | 1.00 | 231 | 1.03 | 646 | 1.03 | 3,500,000 | unchanged | unchanged |
| 22 (invention) | 53 | 38.1 | 1.54 | 355 | 1.58 | — * | — | 6,000,000 | unchanged | unchanged |
| 23 (invention) | 61 | 45.0 | 1.80 | 426 | 1.89 | — * | — | 8,500,000 | unchanged | some peeled |
| 24 (invention) | 63 | 60.7 | 2.42 | 560 | 2.49 | — * | — | >10,000,000 | some peeled | some peeled |
| 25 (comparison) | 33 | 17.0 | 0.68 | 155 | 0.69 | 432 | 0.69 | 100,000 | unchanged | unchanged |
| 26 (comparison) | 92 | 75.3 | 3.01 | 681 | 3.03 | — * | — | >10,000,000 | peeled | peeled |

\* Unmeasurable due to the tester limit

The effectiveness of the present invention is evident from Table 2.

Note that the protective films of all the samples in Table 2 had a pencil hardness of less than 2H measured as in Example 1. They had a coefficient of dynamic friction B in the range of 0.20 to 0.30, which was acceptable.

The durability of the magneto-optical disc and magnetic head versus the dynamic hardness of the magnetic head bearing slider is the same as in Example 1.

Japanese Patent Application No. 311229/1994 is incorporated herein by reference.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. In a magneto-optical disc comprising on a substrate a recording layer and a protective film of radiation-cured resin, wherein information is written in the recording layer with the aid of a magnetic head in sliding contact with the protective film, the improvement wherein in a micro-vibration scratch test made on the protective film by setting the disc in a thin film scratch tester equipped with a diamond indentor having a radius of curvature R (μm) of up to 50 μm, the protective film satisfies the relationship: $0.8 \leq L/R^2 \leq 2.7$ wherein L is the critical load (N.m) under which the thin film is scratched.

2. In a magneto-optical disc comprising on a substrate a recording layer and a protective film of radiation-cured resin, wherein information is written in the recording layer with the aid of a magnetic head in sliding contact with the protective film, the improvement wherein said protective film of radiation-cured resin has a dynamic modulus of $5.0 \times 10^9$ to $4.0 \times 10^{10}$ dyn/cm$^2$ at 100° C.

3. The magneto-optical disc of claim 2 wherein said protective film of radiation-cured resin has a dynamic modulus of $2.5 \times 10^9$ to $3.0 \times 10^{10}$ dyn/cm$^2$ at 150° C.

4. The magneto-optical disc of claim 2 wherein said protective film of radiation-cured resin has a maximum tanδ of up to 0.2.

5. The magneto-optical disc of claim 1 wherein said protective film of radiation-cured resin is obtained by radiation curing a polymerizable composition comprising 40 to 90% by weight of a trifunctional or polyfunctional monomer.

6. The magneto-optical disc of claim 1 further comprising a lubricating layer on said protective film.

7. The magneto-optical disc of claim 1 wherein said magnetic head includes a slider having a dynamic hardness of 5 to 40.

8. The magneto-optical disk of claim 3, wherein said protective film of radiation-cured resin has a maximum tanδ of up to 0.2.

9. The magneto-optical disk of claim 2, wherein said protective film of radiation-cured resin is obtained by radiation curing a polymerizable composition comprising 40 to 90% by weight of a trifunctional or polyfunctional monomer.

10. The magneto-optical disk of claim 2, further comprising a lubricating layer on said protective film.

11. The magneto-optical disk of claim 2, wherein said magnetic head includes a slider having a dynamic hardness of 5 to 40.

* * * * *